United States Patent [19]

Gumb et al.

[11] 4,047,787
[45] Sept. 13, 1977

[54] EXTENSION CORDS FOR PLUG-IN TELEPHONES

[75] Inventors: Beverly William Gumb; Gerd Kuhfus; Frederick Thomas Cogan, all of London, Canada

[73] Assignee: Northern Telecom Limited, Montreal, Canada

[21] Appl. No.: 761,067

[22] Filed: Jan. 21, 1977

[51] Int. Cl.² .................. H01R 13/54; H01R 25/04
[52] U.S. Cl. .................. 339/154 A; 179/1 PC
[58] Field of Search .................. 339/28, 91 R, 99 R, 339/176 M, 154–159, 163, 164, 166 R, 170; 179/1 PC

[56] References Cited

U.S. PATENT DOCUMENTS

| 2,219,568 | 10/1940 | Stewart | 339/164 M |
| 3,668,324 | 6/1972 | Firestone | 339/196 A |
| 3,761,869 | 9/1973 | Hardesty et al. | 339/99 R |

Primary Examiner—Roy Lake
Assistant Examiner—Neil Abrams
Attorney, Agent, or Firm—Sidney T. Jelly

[57] ABSTRACT

An extension cord for plug-in telephones comprises a line cord having a plug at one end for insertion in a telephone outlet and multi-outlet member on the other end. The multi-outlet member is in the form of a hollow box-like member in the front of which are at least two apertures with a jack aligned with an behind each aperture for insertion of a plug. A back cover is attached to the multi-outlet member and the line cord enters through a slot in the cover. The jacks are wired in parallel to the line cord. A latch can be provided on the plug of the line cord and the aperture can be profiled to provide latch engaging formations.

4 Claims, 10 Drawing Figures

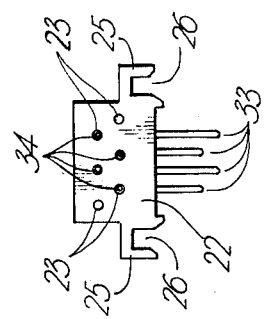
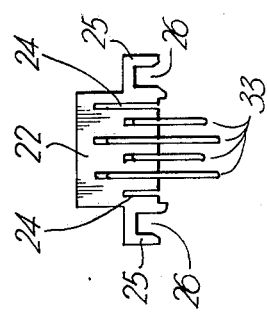
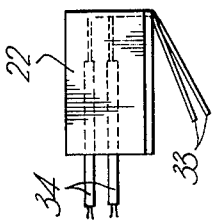
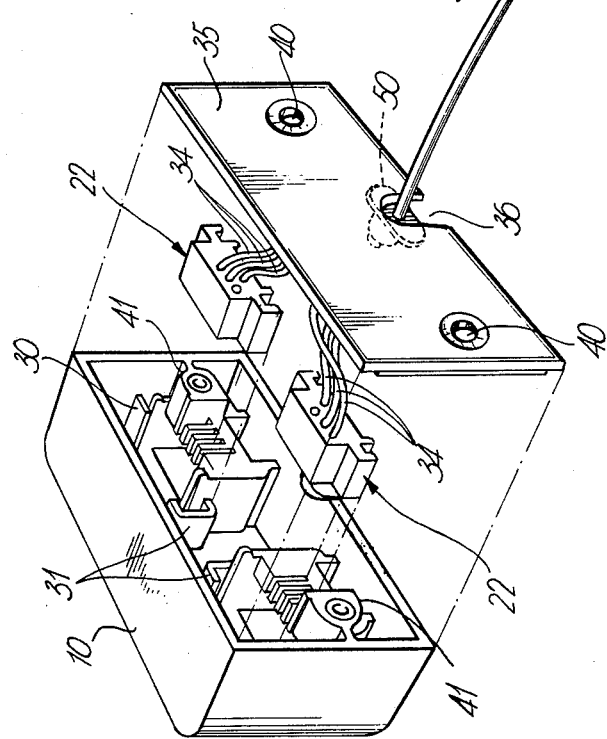

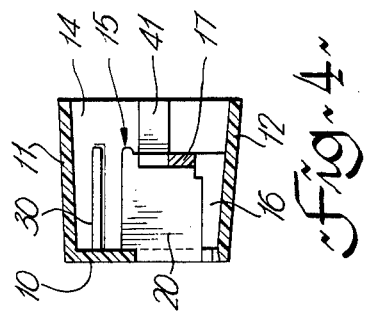
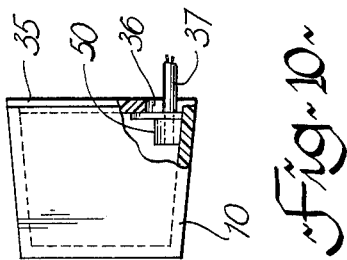
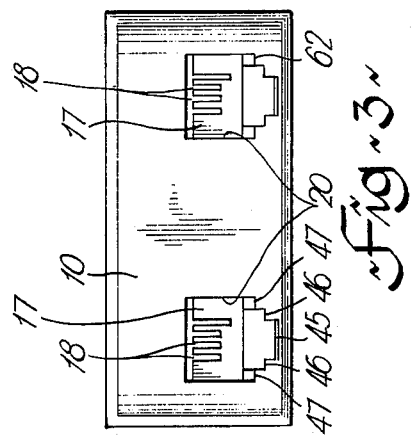
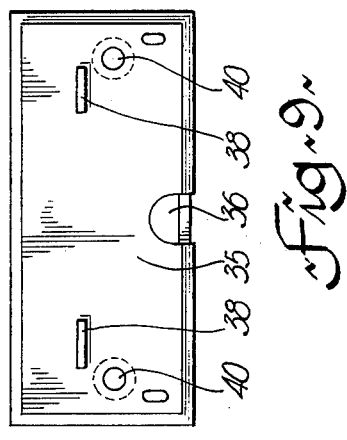
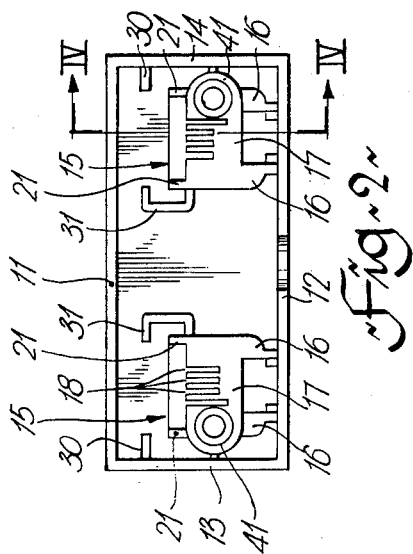
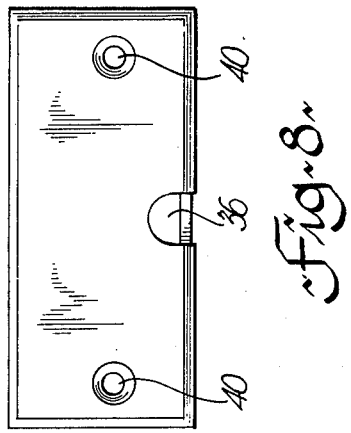

EXTENSION CORDS FOR PLUG-IN TELEPHONES

This invention relates to an extension cord for plug-in telephones, particularly to the line cord, and to provide for a multi-outlet on the extension cord for use with miniature plugs and jacks.

It has been proposed that, in residential premises, the present semi-permanent wired connection of the line cord to a wall outlet or similar be replaced by an outlet having a miniature jack and associated miniature plug. The plug has latch means for preventing inadvertent withdrawal of the plug, the latch means being assembled for actuation to release the plug when desired. There are being provided additional items for use with telephones in residential premises, such as the so-called "hands free" unit which enables the telephone set to be used without removal of the hand set from the telephone, having a microphone and a loudspeaker. Another item is a telephone answering unit.

These additional items are provided for commercial and industrial use and are usually arranged to connect together. For residential purposes it is desired to dispense with the need for service personnel to connect additional items. Also, it is often desirable to connect in such devices at different places in the house at different times. It is therefore desirable that the telephone user be able to do this themselves.

The present invention provides an extension cord for releasably plugging into a miniature jack and having an outlet member providing at least two jacks for the connection of one or more items.

The invention will be readily understood by the following description in conjunction with the accompanying drawings, in which:

FIG. 1 is an exploded perspective view of line cord and outlet member;

FIG. 2 is a rear view of the front main part of the outlet member;

FIG. 3 is a front view of the main part of the outlet member;

FIG. 4 is a cross-section on the line IV—IV of FIG. 2;

FIGS. 5, 6 and 7 are back, front and side views respectively, of one of two connector parts inserted in the main part of the outlet member;

FIGS. 8 is a rear view of the back cover of the outlet member;

FIG. 9 is a front view of the back cover;

FIG. 10 is an end view of assembled outlet member, partly in section to show line cord entry.

As illustrated in FIGS. 2, 3 and 4, the main part of the outlet member is of hollow box-like form having a front 10, top and bottom 11 and 12, and ends 13 and 14. The part 10 is of molded construction of electrically insulating material and formed integrally with the front 11, on the inside thereof, over the lower parts 15 of two jacks or outlets. Each part 15 consists of two spaced apart walls 16 which extend from the front 11. At the rear the walls 16 are connected by a bridge 17. Slots 18 extend down from a top surface of the bridge.

Formed in the front 11 are apertures 20, shaped to fit a plug, not shown. The walls 16 are coincident with the sides of the apertures and the bottom 12 is coincident with the bottoms of the apertures, and define plug-receiving cavities.

The top edges of the walls 16 extend above the bridge 17, as indicated at 21. Slideable on the top edges 21 of the walls 16 are the top parts of the jacks or outlets, illustrated in FIGS. 5, 6 and 7. Each top part is molded of electrically insulating material. Each jack as a main portion 22 having a plurality of bores 23 extending therethrough from front to rear. Grooves 24 extend down the front of the main portion, from each bore 23. At each side of the main portion 22 is a lateral extension 25 having a channel 26 in its undersurface. The channels 26 are spaced apart, and of a width that they will slide on top of the top edges 21 of the walls 16 of the lower parts 15.

To retain the top parts of the jacks on the top edges of the walls 16, retaining members 30 are provided on the ends 13 and 14 and further retaining members 31 extend from the front 11 alongside the inner walls 16, that is the two adjacent or inner walls of the two jacks. The retaining members 30 and 31 hold the top parts of the jacks down on the lower parts.

Extending from the front ends of the bores 23 are spring contacts 32. The contacts 32 are bent down to rest in the grooves 24 and then bent rearwards, as indicated at 33 in FIG. 7. When the upper parts are slid onto the lower parts, the parts 33 fit into the slots 18 in the bridge 17. In the bores 23 the contacts 32 are connected to conductors 34. The number of contacts 32, and position, can be varied. When fully inserted the upper parts of the jacks define the tops of the plug-receiving cavities and the contacts 32 are positioned for contacting by terminals in plugs inserted into the cavities.

The back cover illustrated in FIGS. 8 and 9 is also molded of electrically insulating material, comprising a main flat portion 35 for matching with the top, bottom and ends of the main portion of the outlet member. A groove or slot 36 is formed in the bottom edge of the cover for entry of the line cord 37 (FIGS. 1 and 10). On the inside of the cover two locating members 38 are formed. These locating members 38 abut against the top parts of the jacks in the main part of the outlet member, to retain the top parts in position. In the present example the members 38 contact the main portions 22 of the top parts below the bores 23 to avoid interfering with the conductors 34.

The cover is attached to the main part of the adaptor by screws passing through holes 40 in the cover into bosses 41 formed on one of the walls 16 of each of the jack parts 15.

Retaining means are also provided in the jacks in the outlet member to prevent inadvertent withdrawal of plugs. As seen in FIG. 3, the apertures 20 have a predetermined profile. The bottom edge of each profile is stepped, having a central portion 45, a first step 46 on each side and then a second step 47 on each side. A plug, when inserted, slides along on the second step 47, while the wider part of a latch member slides over the first step 46. The first steps 46 extend only for approximately the thickness of the front 11 of the main portion of the adaptor and when fully inserted the wide part of the latch drops down behind the steps 46. The main part of a latch member rests in the central portion 45, which is inclined to conform with the angle of the latch member. Deflection of a latch member of a plug releases it from behind the steps 46 and permits withdrawal of the plug.

The line cord 37 enters the outlet member via the slot or groove 36 and a strain relief member 50 is attached to the line cord, as by crimping, to prevent inadvertent pulling out of the line cord. The strain relief member 50 may be attached to the cover. The conductors 34 from the jacks are connected to the conductors of the line cord, the conductors 34 being in parallel.

What is claimed is:

1. An extension cord for plug-in telephones, comprising:
   a line cord;
   a plug on one end of said line cord, said plug adapted for insertion in a telephone outlet;
   a multi-outlet member on the other end of said cord, said multi-outlet member comprising a main part of hollow box-like form having a front, top and bottom, and ends, at least two apertures in said front, each aperture having a predetermined profile for reception of a plug therein, a jack aligned with each aperture on the inside of said front, each jack having a lower part integral with said front and comprising two spaced apart side walls extending normal to said front and a bridge member at the rear of said side walls and extending between said side walls and integral therewith, and an upper part positioned on said lower part and including two spaced apart parallel channels in an undersurface thereof, said channels slidable on said side walls of said lower part;
   a retaining member on each end on the inside thereof and two further retaining members extending from the inside of said front, said retaining members extending over said side walls of said lower parts to retain said top parts of said jacks on said lower parts; and
   a back cover attached to the main part, a slot in said back, said line cord passing through said slot into the multi-outlet member, the conductors in said line cord connected to conductors in said jacks, said jacks connected in parallel.

2. An extension cord as claimed in claim 1, each said top part of a jack including a plurality of bores extending therethrough in a direction normal to said front, and spring contacts in said bores, said spring contacts extending forward through said bores and bent down to extend down the front of said upper part, said contacts then bent rearwards beneath said upper part, and slots in said bridge member of each lower part, said slots extending downward from a top edge of said bridge member, said contacts positioned one in each slot with said top part on said lower part.

3. An extension cord as claimed in claim 1, said profile of each of said apertures including a bottom edge, said bottom edge stepped and including a centre portion and at least one step on each step of said centre portion, said steps forming a latch retaining means on a latch of a plug inserted in an aperture into the related jack.

4. An extension cord as claimed in claim 1, including latch means on said plug for releasably retaining said plug in a telephone outlet.

* * * * *